3,585,079
FUEL CELL ELECTRODES HAVING A POLYMERIC METAL-CONTAINING OR METAL-FREE PHTHALOCYANINE CATALYST
Gerhard Richter, Herbert Cnobloch, and Hans-Joachim Henkel, Erlangen, Germany, assignors to Siemens Aktiengesellschaft, Berlin and Munich, Germany
Filed Nov. 14, 1968, Ser. No. 775,834
Claims priority, application Germany, Nov. 16, 1967,
P 16 71 907.6
Int. Cl. H01m 27/00, 13/00
U.S. Cl. 136—86A      6 Claims

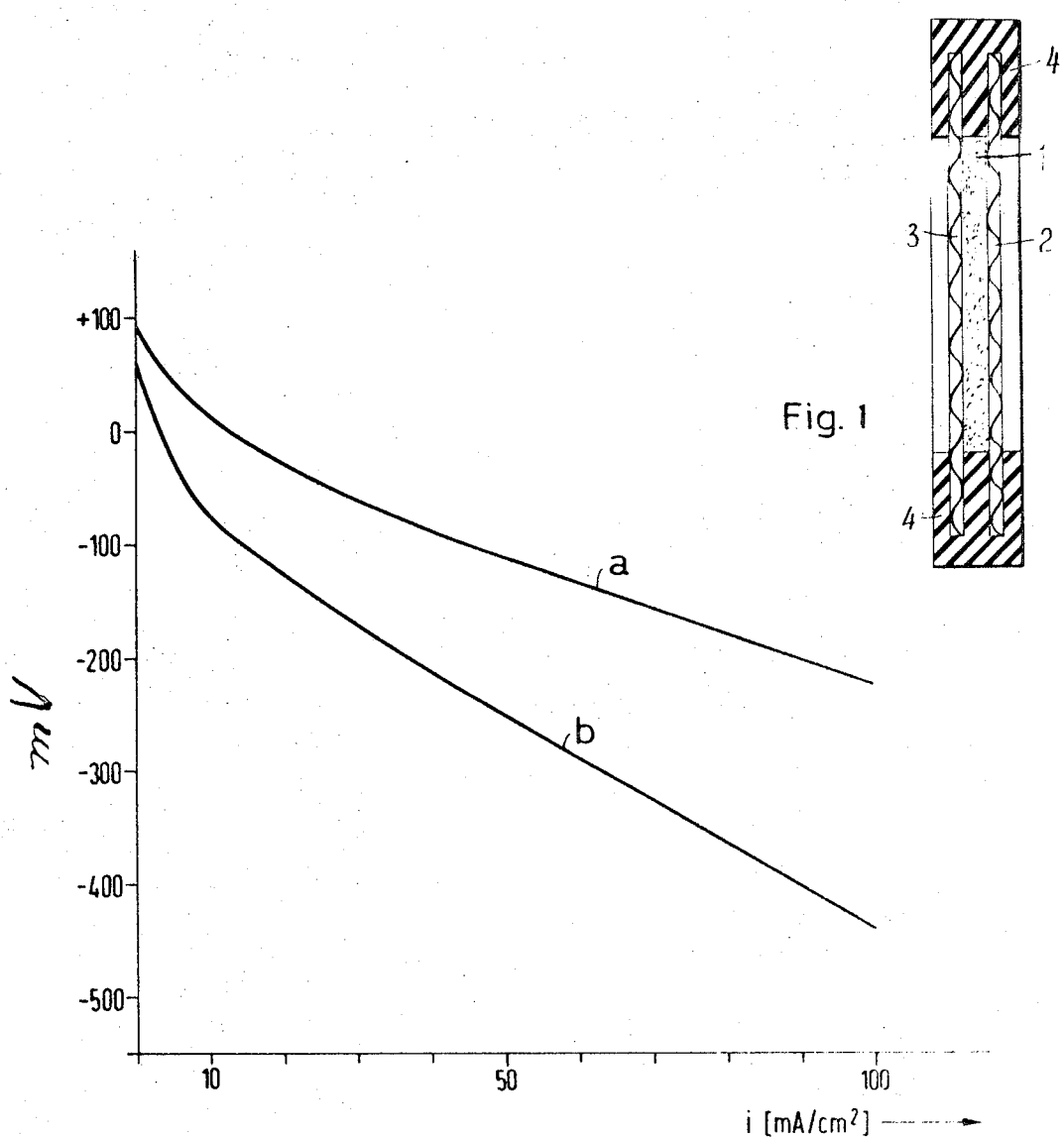

ABSTRACT OF THE DISCLOSURE

A fuel cell comprising an anodic and a cathodic electrode for converting hydrogen and oxygen into fuel elements. The electrodes are characterized in that they are completely or partly comprised of polymeric metal-containing and/or metal-free phthalocyanine, which may be substituted in the core.

SPECIFICATION

The invention relates to fuel cell electrodes which contain polymeric phthalocyanine as an active component, and to a method of producing them.

The use of monomeric metal phthalocyanine as an oxidation catalyst for chemical reactions is known. Thus, for example, nickel phthalocyanine has been employed for the oxidation of long-chain fatty acids, esters, saturated ketones, benzene hydrocarbons, etc. It was suggested in "Nature" 201 (1964) pp. 1212–13 to use these catalysts, particularly cobalt phthalocyanine, as an active component in cathodes of fuel elements. The advantage of organic catalysts over the known electrode catalysts comprised of noble metals is primarily in that the former are relatively inexpensive and can be produced in any desired amount.

The disadvantage of these electrodes is that phthalocyanines have an extremely low conductivity and can therefore not be readily employed as an electrode material. To obtain satisfactory performance, they must either be applied in very thin layers upon the surfaces of conducting carrier material or be mixed with conductive, pulverulent material. Hence the output remains small with respect to the electrode mass being used.

It is an object of the present invention to overcome the aforedescribed shortcomings and to find an electrochemical electrode material which has a higher activity compared to the known organic electrocatalysts, so that the aforedescribed reduction in output will not occur.

To this end, and in accordance with the present invention, the electrodes are comprised completely or partly of polymeric metal-containing and/or metal-free phthalocyanine which, if necessary, is substituted in the core. Polymeric phthalocyanines as well as their derivatives, substituted in the core, are previously known and may be produced, for example, in accordance with Z. Chem., 6. Jahrgang (1966) page 69, in a way whereby 1,2,4,5-tetracyanobenzene and anhydrous metal halogenides are heated under reflux, in a mixture of formamide/glycol for 1 to 2 hours, to approximately 200° C. Following purification through extraction with ethanol, dilute hydrochloric acid and water, the polymeric phthalocyanines obtained are preferably also dried in a vacuum of $10^{-4}$ torr and subsequently heated at 250° C.

The manufacture of the metal-free, polymeric phthalocyanine may be carried out according to the indicated publication in an analogous manner, by heating 1,2,4,5-tetracyanobenzene in a mixture of glycol/formamide.

According to the simplest embodiment of the invention, the pulverulent, polymeric phthalocyanines which, if necessary, are substituted in the core, e.g. halogenized phthalocyanines, are accommodated in moist or dry condition, between two porous, electricity conducting plates, such as metal nets, held by a frame comprised of insulating material and pressed together to result in a fuel battery. Depending on the solubility of the polymeric phthalocyanines, the electrodes may be used in an alcoholic as well as in an acid electrolyte.

Most favorable for the use as catalysts for fuel cell cathodes are considered the polyphthalocyanines of copper, cobalt, silver, nickel, iron, manganese and chromium, and as catalysts for the fuel cell anodes the polyphthalocyanine of copper, as well as the metal-free polyphthalocyanine.

With respect to the foregoing, it is most surprising that the polymeric phthalocyanines not only have a higher specific conductivity, compared to the monomeric phthalocyanines, i.e. by several powers of ten higher, but beyond this, also show an increased activity which also increases the electrochemical output at the electrodes.

The drawing shows in
FIG. 1, an electrode as described by the invention; and in
FIG. 2, graphically the increased efficiency of the catalyst of this invention.

An additional advantage of the new catalysts is the fact that they may be used in anodes as well as cathodes of fuel elements which simplifies the proces of the production of electrodes to a great extent. It is also remarkable that a number of polymeric phthalocyanines, particularly copper polyphthalocyanines, are resistant to acids. While previously only noble metals could be used as an active anode material in an acid electrolyte, it is now possible to substitute for said noble metal with great success the cheap, organic catalysts according to the invention. This is of particular advantage in such fuel elements wherein carbon containing fuels are reacted under carbon dioxide formation.

Thus an electrode such as described in FIG. 1 can be prepared. In this figure, 1 denotes the electrode element per se, while 2 and 3 are the metal nets or screens which hold the electrode element in place in frame 4 which is to be inserted into the fuel cell.

The activity of the new catalysts may be further increased by tempering. Temperatures of 300 to 500° C., particularly 450° C., are suitable. The tempering period may last up to four hours and depends on the respective polyphthalocyanines to be tempered, as well as on the temperature.

The electrodes according to the invention may be still further improved by mixing the polymeric phthalocyanines with powders of metal, carbon or graphite and by pressing them, subsequently, into electrode frames by means of electricity conducting nets. Needless to say, instead of conductive powders, fibers or nets of conductive material may also be used which serve as current conductors as well as for the purpose of increasing the activity of the surface.

A particularly favorable embodiment of the invention is in effecting polymerization directly upon metal or carbon powders. The particles serving as current conductors and as carrier material are preferably compressed with the original materials to form an electrode, prior to polymerization. During the heating process, the metal or carbon particles are coated with a layer comprised of polymeric phthalocyanine and the result is a highly porous, formed body which is very effective as a catalyst. This body, possibly after being cleaned with the aid of extraction agents, may be immediately installed into an electrode holder or may, after having been broken up, be used as a pulverulent electrode.

Good results can also be obtained by carrying out the polymerization on nets, respectively fibers of metals or carbons, rather than on powders.

The new electrodes may be produced, as heretofore, by precipitating the polymeric phthalocyanines from their solution, more particularly a concentrated sulphuric acid solution, upon a porous structure, which serves as a carrier material as well as a current deflector, e.g. a metal net. The new electrodes can also be produced by letting pyromellitylnitrile vapor act directly upon the respective metal powder, for example Raney cobalt, at 250 to 400° C.

The object of the present invention will be disclosed in still greater detail in the following examples:

EXAMPLE 1

A mixture of 5 g. pyromellitic acid dianhydride, 1.9 g. anhydrous cobalt chloride, 26 g. urea and 0.3 g. ammonium molybdate were heated for 30 minutes to a temperature of 220° C. The dark-colored product which is formed thereby is dissolved in 50 ml. concentrated $H_2SO_4$ and reprecipitated by being poured in 1 liter distilled water. Following filtration, washing and drying, 2 g. of the purified product are again heated with 0.1 g. anhydrous cobalt chloride, 26 g. urea and 0.1 g. ammonium molybdate to 220° C., for 30 minutes and, as before, dissolved in sulphuric acid. The sulphuric acid solution is mixed with 2 g. carbon powder and poured into 1 liter distilled water. The filtered and washed cobalt polyphthalocyanine which contains carbon powder is dried at approximately 200° C. and 0.5 mm. mercury. It is then tempered at 450° C., under inert gas, and subsequently installed between two nickel nets into an electrode holder, comprised of Plexiglas. In a half-cell device, the current density potential curve is plotted in 6 N KOH at 60° C. and 0.4 atmosphere excess oxygen pressure, by means of a counter electrode of platinum sheet and a reference electrode provided with a Luggin capillary.

The thus obtained values are recorded in the curve $a$ of FIG. 2. If a mixture of monomeric cobalt phthalocyanine and carbon powder is used in place of the polymeric cobalt phthalocyanine, then one obtains under the same conditions in the half-cell device a current density potential curve $b$ of FIG. 2. Consequently, in an electrode of the present invention, the current density of 15 ma./cm.$^2$ may be increased to 45 ma./cm.$^2$, i.e. increased by three times, at a potential of 100 mv.

EXAMPLE 2

16 g. pyromellitylnitrile are ground in a mortar with 5.3 g. anhydrous copper chloride and 1 g. urea, compressed with 20 g. copper powder and heated at 300° C. for 19 hours in an autoclave, at 70 atmospheres gauge. Subsequently, the temperature is increased to 350° C. and the mixture is left at this temperature for 2 hours. The thus obtained contaminated product is extracted with pyridine and dried for 72 hours at 350° C., in a vacuum, at 0.05 mercury column.

An electrode thus produced delivers at a hydrogen pressure of 0.4 atmosphere gauge in 6 N $H_2SO_4$, a current of 20 ma./cm.$^2$.

We claim:
1. Fuel cell with an anodic electrode, a cathodic electrode, and an electrolyte, at least one of said electrodes consisting essentially of a polymeric phthalocyanine as catalyst material for conversion of hydrogen or oxygen and a contact material.
2. The fuel cell of claim 1, wherein the contact material is a powder of metal, carbon or graphite, mixed with the phthalocyanine.
3. The fuel cell of claim 1, wherein the contact material is a net of conducting material.
4. The fuel cell of claim 1, wherein the anodic electrode comprises polymeric copper phthalocyanine as the catalyst material.
5. The fuel cell of claim 1, wherein the cathodic electrode comprises a polymeric phthalocyanine of one of the metals silver, copper, cobalt, nickel, iron, manganese and chromium as a catalyst material.
6. The fuel cell of claim 1, wherein the anodic electrode comprises polymeric metal-free phthalocyanine as the catalyst material.

References Cited

UNITED STATES PATENTS

| | | | |
|---|---|---|---|
| 2,980,833 | 4/1961 | Epstein | 252—62.3 |
| 3,108,081 | 10/1963 | Gleim et al. | 252—428 |
| 3,146,131 | 8/1964 | Linden et al. | 136—86 |
| 3,230,180 | 1/1966 | Larson | 252—431 |
| 3,288,653 | 11/1966 | Holt et al. | 136—120 |
| 3,410,727 | 11/1968 | Jasinski | 136—86 |
| 3,429,731 | 2/1969 | Heuse | 136—120 |

WINSTON A. DOUGLAS, Primary Examiner

A. SKAPARS, Assistant Examiner

U.S. Cl. X.R.

136—120FC; 260—314.5